Figure 1:
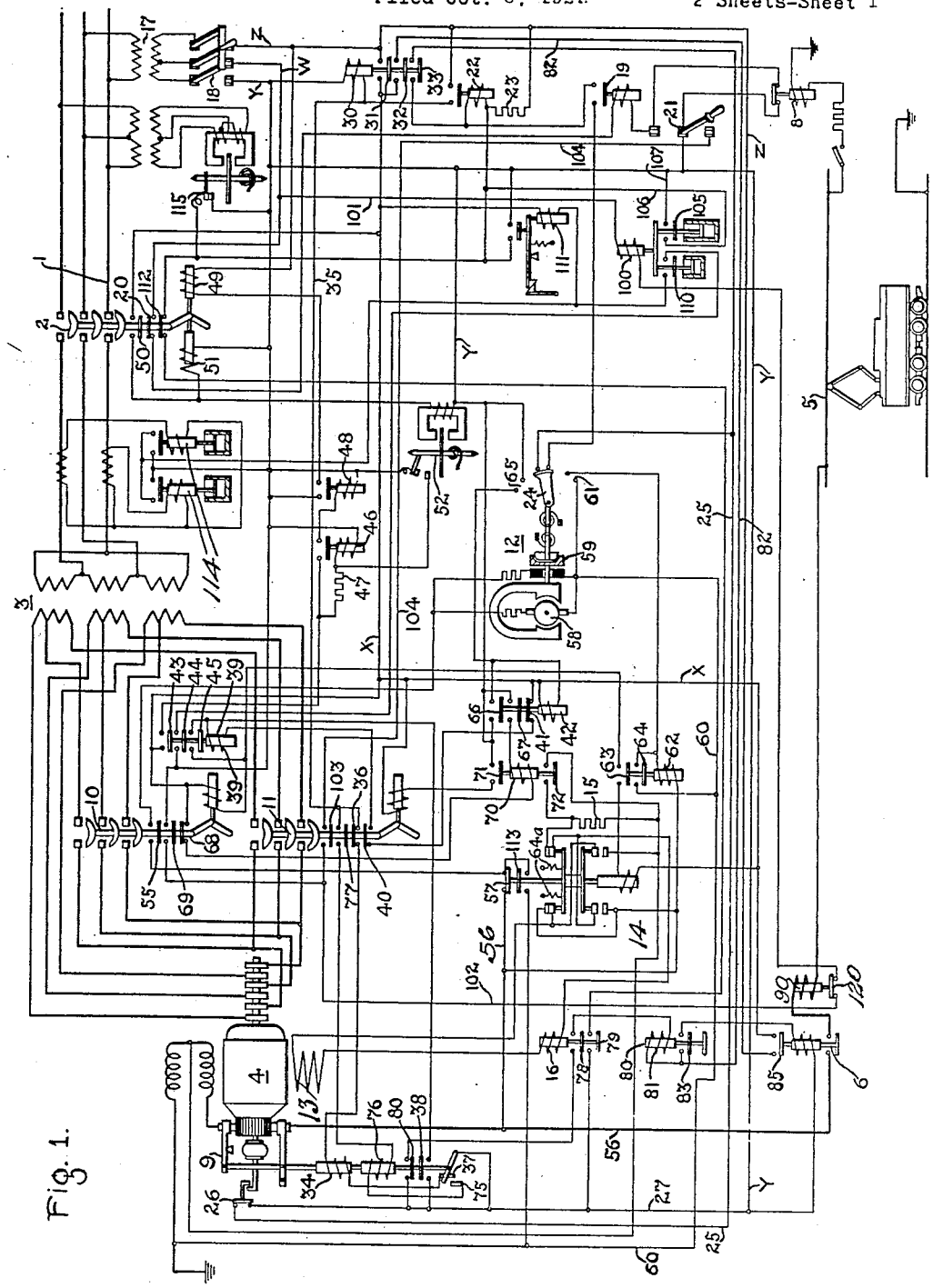

Nov. 11, 1924.

S. G. LEONARD 1,515,260

AUTOMATIC STATION SWITCHING

Filed Oct. 6, 1922    2 Sheets-Sheet 1

WITNESSES:
R. J. Butler.
J. E. Foster

INVENTOR
Stuart G. Leonard.
BY
Wesley G. Carr
ATTORNEY

Nov. 11, 1924.

S. G. LEONARD 1,515,260

AUTOMATIC STATION SWITCHING

Filed Oct. 6, 1922  2 Sheets-Sheet 2

WITNESSES:
R. J. Butler.
J. E. Foster

INVENTOR
Stuart G. Leonard.
BY
Wesley G. Carr
ATTORNEY

Patented Nov. 11, 1924.

1,515,260

UNITED STATES PATENT OFFICE.

STUART G. LEONARD, OF GALION, OHIO, ASSIGNOR TO WESTINGHOUSE ELECTRIC & MANUFACTURING COMPANY, A CORPORATION OF PENNSYLVANIA.

AUTOMATIC STATION SWITCHING.

Application filed October 6, 1922. Serial No. 592,749.

*To all whom it may concern:*

Be it known that I, STUART G. LEONARD, a citizen of the United States, and a resident of Galion, in the county of Crawford and State of Ohio, have invented a new and useful Improvement in Automatic Station Switching, of which the following is a specification.

My invention relates to automatic systems and particularly to systems employed in controlling the operation of automatic substations.

One object of my invention is to provide an automatic system for controlling the starting of a synchronous converter and the development of predetermined polarity at the direct-current end to permit the connection thereof to the direct-current circuit.

Another object of my invention is to provide a system, of the above-indicated character, in which relatively low starting voltage and normal operating voltage are consecutively applied to the converter and in which a timing relay is employed to disconnect the converter from the system if the transfer from starting to running is not made within a predetermined interval of time.

Another object of my invention is to provide a system, of the above-indicated character, in which a relay is provided that is responsive to the current traversing the shunt field winding and that serves to control the connection of the converter to the direct-current circuit when the proper degree of excitation obtains in the field winding.

Another object of my invention is to provide a system employing the field relay mentioned above which serves to disconnect the converter from the system if the circuit of the field winding should become open during operation.

Patent No. 1,435,229, issued Nov. 14, 1922 to F. C. Hanker and C. McL. Moss, and assigned to the Westinghouse Electric & Manufacturing Company, discloses an automatic system in which a synchronous converter is started from the alternating-current side, and the excitation of the shunt field winding is controlled to develop a predetermined polarity at the direct-current end after which transfer is made from starting to running condition by applying normal operating voltage to the converter.

In a copending application, Serial No. 584,601, automatic switching system, filed Aug. 28, 1922 by C. A. Butcher and assigned to the assignee of the present application, means are disclosed and described for introducing an element of time between the opening of the starting switch and the closing of the running switch of an electrical translating device. In practicing my invention, I utilize the general scheme of connections that is disclosed in the above-mentioned application. I provide a timing device that becomes operative as soon as the starting voltage is applied to the converter that serves to disconnect the converter from the alternating-current circuit if the development of the predetermined polarity and the subsequent transfer to running conditions are not effected within a predetermined interval of time, as, for example, one and one-half minutes. Such time interval is regarded as sufficiently ample to permit the development of a predetermined polarity and the transfer to running conditions, since, in average cases, an interval of approximately fifteen seconds is sufficient. If the transfer is not effected within the time interval of the relay setting, the trouble is undoubtedly of a persisting nature and the timing device operates to lock out the substation to preclude its automatic restarting until the station is inspected and the trouble cleared.

I provide, also, another protective feature which consists of a relay that is responsive to the current in the shunt field winding. That relay precludes the connection of the converter to the direct-current circuit unless the winding is sufficiently energized to permit the converter to translate energy from the alternating current circuit to the direct-current circuit.

The relay also serves as a protective device in disconnecting the converter from the system if the field winding should become open-circuited during operation. It also serves to prevent the immediate reconnection of the converter to the system while the converter is rotating at approximately synchronous speed and is maintaining the energization of the field winding if the converter has been just disconnected and the starting device associated with the converter tends to actuate the controlling devices to effect the immediate reconnection of the converter to the system.

Figure 1 of the accompanying drawings is a diagrammatic view of an electrical system embodying my invention.

Figure 2:
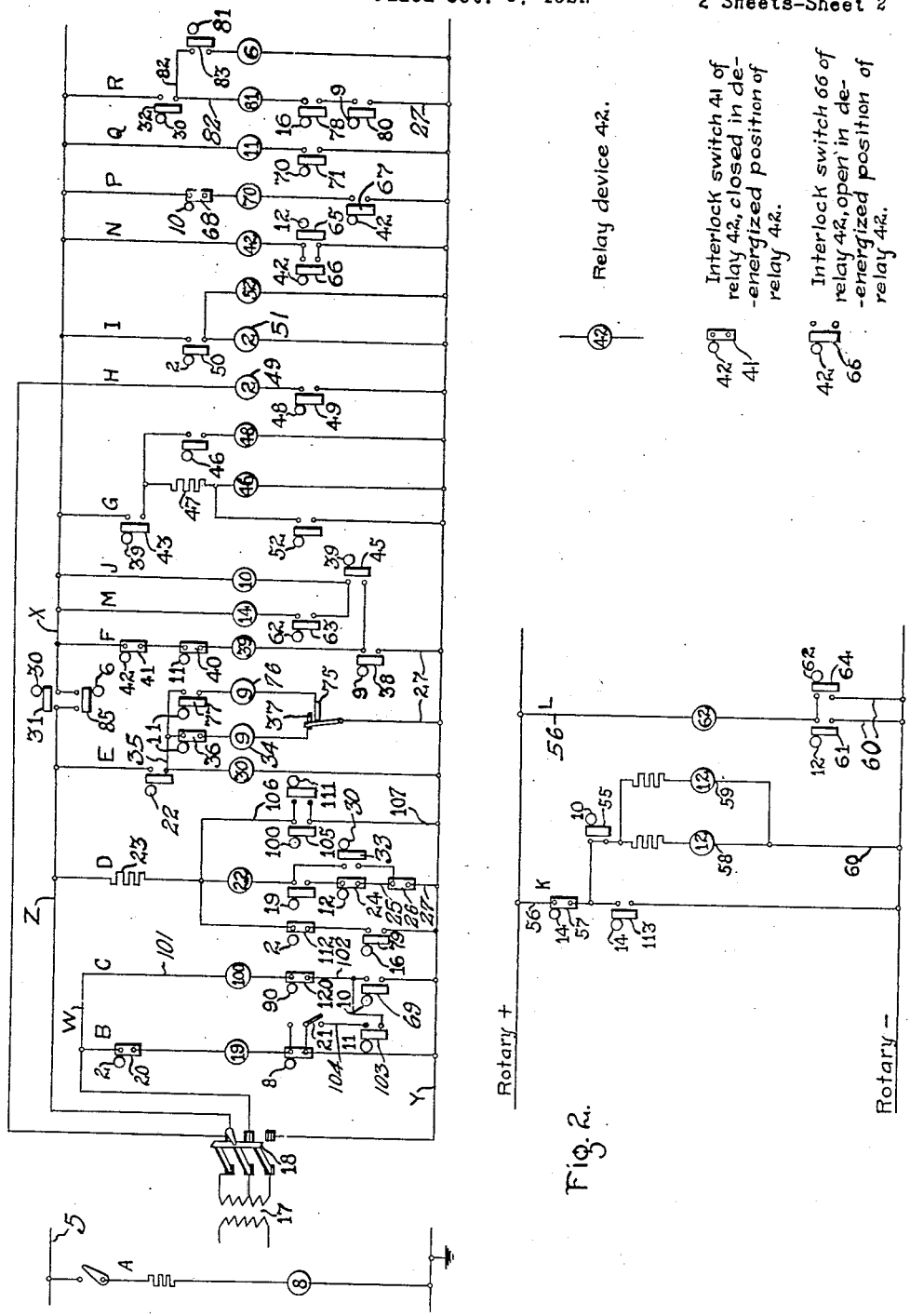

Fig. 2 is a schematic diagram showing, in simplified form, the individual circuits that control the energization of the respective operating coils associated with, and controlled by, such circuits.

In referring to the accompanying drawings, the main and interlock switches of all of the apparatus are shown in the individual circuits of the schematic diagram in Fig. 2 in the de-energized position of the control device or apparatus with which the respective switches are associated.

In the system that is illustrated, energy is received from an alternating-current circuit 1 through a circuit interrupter, or other switching means 2, and a plurality of power transformers 3 by a rotary transformer or synchronous converter 4 which translates such energy into direct-current energy to be thereupon supplied to a direct-current circuit, such as a trolley circuit 5, through a switching device 6.

When the voltage of the direct-current circuit 5 decreases to a predetermined value indicating a demand for energy, a voltage relay 8 becomes sufficiently de-energized to close its switch. The coil of relay 8 is connected between the trolley circuit 5 and ground, as shown in individual circuit A of the schematic diagram.

When the demand upon the circuit 5 is manifested by the decrease of voltage and the consequent closing of the relay switch 8, various control devices, to be described later, are operated to close the main switch 2 and energize the transformers 3. All but two brushes of opposite polarity are then raised from the commutator cylinder by a brush-raising mechanism 9, and a starting switch 10 is then closed to impress a starting voltage of relatively small value upon the converter windings to start the converter and accelerate it to sychronous speed. At synchronous speed, the converter develops its polarity at random. If such polarity is a predetermined polarity corresponding to the polarity of the trolley circuit, the starting switch 10 will be opened and a running switch 11 closed to remove the starting voltage and to apply normal operating voltage to the converter. The brush-controlling mechanism 9 is thereupon operated to lower the brushes to the commutator cylinder, after which the converter is connected to the trolley circuit through the switch 6.

If, while the starting voltage is applied to the converter, the latter should develop a polarity reverse to that of the direct-current circuit, a polarity-responsive relay 12, that is energized through the two unraised brushes, would control the reversing of the field winding 13 of the converter by means of a field-reversing switch 14. After the converter polarity is reversed and then built up in the right direction, the field winding is connected in the proper manner to permit its energization always in the same direction, after which the transfer is made from starting to running condition.

In order that the degree of excitation of the field winding and of the field-magnet-pole members may be limited when the polarity is developed in the reverse direction, a resistor 15 is disposed in circuit with the field winding, that is effective while the winding is connected to the converter brushes in the proper manner but which is eliminated from the circuit when the field winding is reversed by the polarized relay to reverse the excitation of the field-magnet-pole members.

If the polarity is developed in the wrong direction, the resistor 15 is, of course, effective in limiting the excitation only while the polarity is being developed in such wrong direction. If the polarity is developed in the right direction, the resistor 15 is immediately short-circuited during the transfer from starting to running condition.

A relay 16 is disposed in the circuit of the field winding and is effective to preclude connection of the converter to the direct-current circuit if the circuit of the field winding should be open and is similarly effective to disconnect the station if the circuit should become open during operation.

Control energy to operate the control apparatus is derived from the alternating-current circuit 1 through an auxiliary transformer 17 and a switch 18 which is provided to manually disconnect the station equipment from the source of control energy when it is desired to inspect the apparatus.

Upon referring to individual circuit B of the schematic diagram, it will be seen that, when the relay switch 8 closes, by reason of the decreased voltage on the direct-current circuit 5, a circuit will be completed between a control bus W and a control bus Y which controls the energization of a relay 19. This circuit may be traced from the bus conductor Y through the switch 8 in its deenergized position, the operating coil of the relay switch 19 and an interlock 20 that is closed when the main interrupter 2 is open, to the control bus conductor W.

A single-pole, double-throw, manually-operable switch 21 is associated with the relay switch and is adapted, when closed in the upper position, to short-circuit the switch 8. The switch 21 is closed in its upper position when it is desired to start the station manually and in its lower position when the station is to be automatically started in response to a predetermined voltage condition in the direct-current circuit 5.

Upon referring to circuit D, it will be observed that the operating coil of a relay 22 is energized as soon as the relay switch 19 closes and such circuit may be traced from bus conductor Z through a resistor 23, the operating coil of the relay 22, the relay switch 19, a normally-closed neutrally-positioned switch 24 of the polarized relay 12, a conductor 25, an overspeed device 26 and a conductor 27 to control bus conductor Y. The winding of relay 22 is thereupon energized to close its switch.

The relay switch 22, when closed, completes a circuit E that energizes the operating coil of a master relay 30 from control bus conductor Y through the operating coil of relay switch 30 to control bus conductor Z. The relay 30, when energized, closes three switches 31, 32 and 33, respectively. Switch 31, when closed, connects the main control bus conductor Z to an auxiliary control bus conductor X from which the control devices operating subsequently thereto are energized. Thus, upon the opening of the switch 31, the control devices may be simultaneously and quickly de-energized to disconect the converter from the system.

Switch 33 of relay 30, when closed, short-circuits relay switch 19 and the neutrally-positioned switch 24 of the polarized relay, thereby maintaining a holding circuit for the relay 22. These circuit relations are more clearly apparent from the circuits D and E in the schematic diagram. Relay 22 energizes relay 30, which, in turn, maintains the energizing circuit for relay 22.

Upon referring to the right hand portion of the circuit E, it will be observed that the relay switch 22, when closed, completes a circuit through a raising coil 34 of the brush-control mechanism 9. This circuit may be traced from bus conductor Z through the switch 22, a conductor 35, an interlock switch 36 that is closed when the running switch 11 is open, the raising coil 34 of the brush-operating mechanism, a limit switch 37 and the conductor 27 to the control bus conductor Y. The brush mechanism is thereupon operated to raise all but two of the brushes from the commutator cylinder.

The brush-raising operation is maintained until the circuit of the raising coil 34 is opened by the limit switch 37. In this position, an interlock switch 38 is closed which energizes the operating coil of a relay 39, as is shown in circuit F. Relay 39 is the control relay for the starting switch 10. The circuit may be traced from the bus conductor Y through the conductor 27, the interlock switch 38 of the brush-operating mechanism, the operating coil of the relay 39, an interlock switch 40 that is closed when the running switch 11 is open, and an interlock switch 41 that is controlled by a transfer relay 42 to the auxiliary bus conductor X. The relay 39 is thereupon energized to close three switches 43, 44 and 45, respectively.

Switch 43, of relay 39, when closed, completes the circuit G of the operating coil of a relay 46 from the auxiliary control conductor X, through the switch 43, a resistor 47 and the operating coil of the relay 46 to control bus conductor Y. Relay 46 and a relay 48 control the closing of the interrupter 2.

The relay 46 closes its switch to energize the operating coil of relay 48 which circuit may be traced, as seen in the right hand portion of circuit G, from bus conductor X through switch 43, relay switch 46 and operating coil of relay 48 to control bus conductor Y. The relay switch 48, when closed, connects the closing coil 49 of the main switch 2 between the main control conductors Y and Z, as shown in circuit H, whereupon the interrupter 2 is closed. Since the interrupter 2 is provided with a low-voltage trip coil 51 for holding the interrupter closed when the voltage of the circuit 1 is normal, the closing coil 49 may be de-energized after the interrupter is closed.

An interlock switch 50, that closes with the main contact members of the interrupter 2, energizes circuit I including the low-voltage coil 51 of the interrupter 2 and an auxiliary time-element relay 52 which closes its contact members a few seconds after being energized to short-circuit the coil of the relay 46, as shown in the left portion of circuit G. The relay 46 is thereupon de-energized to open its switch, and the relay switch 48 is thereupon permitted to open, thereby de-energizing the closing coil of the interrupter 2.

Simultaneously with the operation of the respective relays 46 and 48 that effect the closing of the main interrutper 2, the interlock switch 45 of the relay 39 completes the circuit including the operating coil of the starting switch 10 to effect the closing of that switch to apply starting voltage to the converter. This circuit may be traced, as shown in circuit J, from control bus conductor Y through conductor 27, the interlock switch 38 of the brush-controlling mechanism, the switch 45 of relay 39 and the operating coil of the starting switch 10 to the control bus conductor X. Starting voltage is now applied to the converter which is then accelerated to synchronous speed.

Let it be assumed that the converter attains synchronous speed with the reverse polarity. The starting switch 10, when closing, closes an interlock switch 55 which connects the windings of the polarized relay device 12 across the two unraised brushes of the commutator cylinder of the converter. This circuit may be traced, as shown in the circuit K of the schematic diagram, from the desired positive brush of the converter through conductor 56, a normally closed interlock switch 57 that is closed by the field-reversing switch 14, interlock switch 55 of the starting switch 10, an armature winding 58 and a clutch winding 59 of the polarized relay 12, and a conductor 60 to the desired negative brush of the converter.

The polarized relay 12, immediately upon being energized, secures the rotating member of the motor to the movable arm 24 by means of the magnetic clutch coil 59. If the polarity is in the reverse direction, as has been assumed, the movable contact member 24 will gradually be actuated to bridge the contact member 61, whereupon a relay 62, to control the field switch 14, will be energized, as shown in circuit L, by being connected directly across the brushes of the converter between the conductors 56 and 60.

The relay 62, when energized, closes two switches 63 and 64, respectively. Switch 64 completes a holding circuit to maintain the relay winding connected between the converter brushes so long as the potential difference across the brushes is sufficient to maintain the relay energized to hold the same closed.

The switch 63, when closed, completes the energizing circuit for the operating coil of the reversing switch 14, as shown in circuit M. This circuit may be traced from control bus conductor Y through conductor 27, the interlock switch 38 of the brush control mechanism, the switch 45 of the relay 39, the switch 63 of the relay 62 and the operating coil of the field switch 14 to the control bus conductor X. The field winding is thereupon connected to the brushes of the converter commutator in a reverse manner, thereby reversing the excitation of the field-magnet-pole members.

As the electromotive force developed by the converter gradually decreases to zero, the voltage available to maintain the relay 62 energized decreases until it is insufficient to maintain that relay in its energized position. The switches 63 and 64 are thereupon opened. Switch 63, when open, de-energizes the circuit of the operating coil of the field switch 14 which is thereupon actuated to its normal position by operating springs 64ª. The converter will then slip a pole and develop the polarity in the right direction.

If, for any reason, the polarity should again develop in the wrong direction, the same reversing operation will be effected until the correct polarity is developed in the converter. Normally, however, little difficulty is encountered in such reversing operations and, ordinarily, one reversal is sufficient to reverse the polarity to cause it to be developed in the right direction.

When the polarity is developed in the right direction, the polarized relay 12 actuates the bridging member 24 to engage the contact members 65 which completes the energizing circuit of the operating coil of the transfer relay 42, as illustrated in circuit N, from control bus conductor Y through switch contact member 65 of the polarized relay and the operating coil of the relay 42 to control bus conductor X.

A switch 66 is closed when the operating coil of the relay 42 is energized and is connected in parallel with the contact members 65 of the polarized relay 12 to maintain a holding circuit for the operating coil of relay 42 after it is once energized.

The transfer relay 42, when energized, opens its switch 41 and closes, in addition to the switch 66, another auxiliary switch 67. The switch 41, when opening, opens the circuit of the operating coil of the control relay 39 for the starting switch 10, as shown in circuit F.

The starting switch 10 thereupon opens, and, when in full open position, closes an auxiliary interlock switch 68 and opens a switch 69. As is shown in the schematic circuit P, the interlock switch 68, of the starting switch 10, when closed, co-operates with the interlock switch 67 of the transfer relay 42 to energize the circuit of a control relay 70 for the running switch 11 by connecting the operating coil between the control bus conductors X and Y.

The relay 70, when actuated to its energized position, closes two switches 71 and 72. Switch 71, when closed, connects the operating coil of the running switch 11 directly to the control bus conductors X and Y, as shown in circuit Q, whereupon the running switch 11 is closed to apply normal operating voltage to the converter windings. The converter is now in proper condition to be connected to the direct-current circuit.

In order to permit the converter to build up or develop its voltage quickly, the switch 72 of the relay 70 short-circuits the resistor 15 that is connected in series with the field winding. The limiting effect of the resistor being thus eliminated, the excitation of the field winding is permitted to increase rapidly.

The brushes of the commutator may now be lowered. The control circuit for effecting the lowering of the brushes may be traced, as will be seen by referring to schematic circuit E, from control bus conductor Y through conductor 27, limit switch 75, operating coil 76 of the brush-control mechanism 9, an interlock switch 77 that is closed when the main switch 11 is closed, and the switch of the relay 22 to the control bus conductor Z. The lowering coil 76 of the brush-control mechanism will, therefore, be energized to lower the brushes to the commutator cylinder, after which the limit switch 75 will be opened.

While the brushes are being lowered, the field excitation is being increased until finally such excitation attains a value sufficient to energize and operate the field relay 16 which thereupon closes its two switches 78 and 79. The switch 78, when closed, cooperates, as shown in circuit R, with an interlock switch 80 that is closed when the brushes are lowered to the commutator cylinder, and the interlock switch 32 of the master-relay 30 to complete an energizing circuit for the operating coil of a relay 81 to control the closing of the direct-current switch 6. The circuit may be traced from bus conductor Y through conductor 27, the interlock switch 80 of the brush mechanism, the interlock switch 78 of the field relay 16, the operating coil of relay 81, a conductor 82 and the interlock switch 32 of the master relay 30 to control bus conductor X. The relay 81 is thereupon energized to close its switch 83.

After the brushes are lowered and the field winding is sufficiently energized, the converter is connected to the direct-current circuit. Switch 83 of the relay 81, when closed, completes the circuit of the operating coil of the direct-current switch 6, as shown in schematic circuit R. This circuit may be traced from control bus conductor Y through the operating coil of switch 6, the switch 83 of the relay 81, the conductor 82 and the switch 32 of the master relay 30 to the control bus conductor X. The switch 6 is thereupon closed to connect the converter 4 to the direct-current circuit 5. Switch 6, when closed, closes an auxiliary interlock switch 85. Switch 85, when closed, connects main control bus conductor Z to the auxiliary control bus conductor X and is connected in parallel relation to switch 31 of master relay 30. The switch 85 is larger than the switch 31 and serves to conduct current to the auxiliary control bus conductor X during the continued operation of the converter.

If the demand should decrease to, or below, a predetermined value for a predetermined interval of time, it is desired to shut down the station to obviate the expense of running the machine idly. A timing relay 100 is therefore employed which may be adjusted to operate at different time intervals from the range of approximately three minutes to one-half hour which serves to disconnect the converter from the system when the demand on the station decreases to a predetermined value for a predetermined interval of time corresponding to the setting of the relay. The operation of this relay may be more readily understood by reference to schematic circuit C.

The circuit of the operating coil of the timing relay may be traced from the auxiliary bus conductor W through a conductor 101, the operating coil of timing relay 100, the switch 120 of underload relay 90, a conductor 102, an interlock switch 103 that is closed when the normal-voltage running switch 11 is closed, a conductor 104 and the switch 21 in its lower position to the control bus conductor Y.

The switch 120 of the underload relay 90 will be closed only when the current taken from the converter is less than a predetermined value. When timing relay 100 is energized for a predetermined interval of time, it will close a switch 105 that may be adjusted for any time interval within the operating range of three to thirty minutes. When the switch 105 of the timing relay 100, operating in response to the time and the demand, closes, it effects the disconnection of the converter from the system by short-circuiting the operating coil of the relay 22, whereupon the operating switches and the control devices for the converter are de-energized and actuated to their respective open positions. The switch 105 short-circuits the operating coil of the control relay 22, as will be seen by referring to the schematic circuit D. Such connection is made through two conductors 106 and 107.

The operating coil of the relay 22 is then de-energized, permitting the switch to open and de-energize the operating coil of the master relay 30 whereupon the auxiliary control bus conductor X is disconnected from the bus conductor Z by the switch 31. The same conductors are then disconnected by the switch 85 of the main direct-current switch 6, since the operating coil of the switch 6 is de-energized by the opening of switch 32 of the master relay 30. This operation is more readily apparent by reference to schematic circuit R.

The timing relay 100 is also provided with an additional timing element 110 which is employed as a protective feature during the starting operation of the converter to disconnect the converter from the alternating-current circuit and to lock out the control apparatus to preclude the automatic reconnection of the converter until the station is visited by an inspector and the trouble cleared.

The timing element switch 110 is normally adjusted to be closed after an interval of approximately one minute to one and one-half minutes, which interval of time is deemed sufficient to permit the development of a predetermined polarity and the transfer from starting conditions to running conditions by transferring from starting switch 10 to running switch 11. If such transfer is not made within the interval for which the time-element switch 110 is adjusted, the switch 110 closes to energize the circuit of a lock-out relay 111 which maintains a short-circuit across the operating coil of the relay 22 until the relay 111 is reset by hand.

The lock-out relay 111, when operated, short-circuits the operating coil of the relay 22 by connecting the conductors 106 and 107, which may be more readily understood by referring to schematic circuit D.

When the transfer from starting to running conditions is not made within a predetermined interval, such condition is normally indicative of frozen bearings or other trouble that will preclude normal operation of the converter. It is desirable, therefore, to prevent entirely any automatic operation of the converter until the station is visited and the trouble eliminated.

Under certain conditions, it is desirable and essential that the apparatus should not function to effect the immediate connection of the converter to the system. For example, if there has been no demand on the station for a predetermined interval of time and the time-delay relay operates to disconnect the station, it is possible that the voltage of the direct-current circuit may decrease to effect the initiation of the starting apparatus immediately after the disconnection of the converter.

Inasmuch as the converter is yet rotating at synchronous speed, if the converter were connected to the starting taps of the transformer, a false indication of correct polarity would immediately effect the connection of the converter to the normal operating connections of the transformer. Since the indication of correct polarity was due to the electromotive force that was generated from the residual magnetism rather than to the polarity of the electromotive force generated by reason of the applied starting voltage, the immediate connection of the converter to the full-voltage terminals of the transformer might occasion considerable damage to the converter windings.

In order to preclude such immediate application of full operating voltage to the converter, the operation of the initiating and controlling relays 22 and 30 is precluded until the field excitation decreases to or below a predetermined value. That operation is controlled by means of the switch 79 of the field relay 16 and an inter-lock switch 112 of the main circuit interrupter 2 that is closed when the interrupter is opened. Thus, if the interrupter is opened while the field relay 16 is energized and its switch 79 is maintained closed, the operating coil of the relay 22 will be short-circuited to preclude its energization until the switch 79 of the field relay 16 is opened. This operation may be more readily visualized upon reference to the left-hand portion of schematic circuit D.

Overload relays 114 are provided that serve also to energize the lock-out relay 111 when an excessive overload occurs on the alternating-current end of the converter which is sufficiently excessive to indicate abnormal conditions within the station.

In order to preclude operation of the converter, under low-voltage, single-phase or reverse-phase conditions, a relay 115 is provided that is responsive to any one of such conditions to permit the closure of its switch if any one of such conditions occurs. The relay 115 also short-circuits the operating coil of the relay 22 to effect immediate disconnection of the converter from the system. Upon the recurrence of normal conditions, however, the switch opens to permit the re-energization of the relay 22.

By arranging the protective devices to control the energization of the relay 22 according to the faulty condition that occurs, the protective devices may distinguish between temporary abnormal conditions and persisting faulty conditions to merely disconnect the machine temporarily to maintain such disconnection and preclude the automatic reconnection until the faulty conditions are eliminated.

By means of the timing relay that is operative until the transfer from starting to running conditions, I effect the disconnection of the converter from the system if the transfer it not made within a predetermined time. The failure to transfer from starting to running conditions within such interval of time is a manifestation of persisting trouble, such as frozen bearings. Under such conditions, it is desirable to lock the station and prevent its automatic restarting until the station is inspected and the trouble cleared.

The field relay which I have provided serves to preclude the connection of the converter to the direct-current circuit until the converter is in proper energy-translating condition and serves also to disconnect the converter from the system if the winding should become open-circuited during operation. The relay further serves to prevent the reconnection of the converter to the system after the switching devices have been opened and while the converter is still rotating at substantially synchronous speed if a demand for energy should be manifested on the direct-current circuit immediately after the opening of the switching devices. This feature is essential, since a false indication of polarity would be given by the normal operating voltage of the synchronously rotating machine and the machine might be connected between the system with its polarity actually developing in the wrong direction.

I have illustrated merely schematically the operation of the various control devices and it will, therefore, be understood that changes may be made in the structure and in the arrangement of the devices without departing from the spirit and scope of my invention, as set forth in the appended claims.

I claim as my invention:

1. In an electrical distribution system, the combination with an alternating-current circuit, a direct-current circuit and a synchronous converter to be connected therebetween, of means for applying starting voltage to the converter winding from the alternating-current circuit, means for subsequently applying normal operating voltage, means dependent upon the development of a predetermined polarity in the converter for controlling the transfer from starting to running voltage and means for disconnecting the converter from the alternating-current circuit if the development of a predetermined polarity in the converter and the subsequent transfer from starting to running voltage are not effected within a predetermined interval of time.

2. In an electrical distributing system, the combination with an alternating-current circuit, a direct-current circuit and a synchronous converter to be connected therebetween, of means for applying a starting voltage to the converter from the alternating-current circuit, means for then controlling the development of a predetermined polarity in the converter corresponding to that of the direct-current circuit, means operative after the development of the predetermined polarity in the converter for rendering the starting-voltage means non-operative and for controlling the application of normal operating voltage to the converter from the alternating-current circuit, and means operative while the converter polarity is being developed during the starting operation to disconnect the converter if such predetermined polarity is not developed within a predetermined interval after the starting voltage is applied to the converter.

3. In an electrical distribution system, the combination with an alternating-current circuit, a direct-current circuit and a synchronous converter to be connected therebetween, of means for applying starting voltage to the converter windings from the alternating-current circuit, means for subsequently applying normal operating voltage, means dependent upon the development of a predetermined polarity in the converter for controlling the transfer from starting to running voltage, and time-measuring means for rendering both starting and running voltage-applying means non-operative upon the failure of said polarity-responsive transfer-controlling means to function.

4. In an electrical distribution system, the combination with an alternating-current circuit, a direct-current circuit and a synchronous converter to be connected therebetween, of means for applying starting voltage to the converter windings from the alternating-current circuit, means for subsequently applying normal operating voltage, means dependent upon the development of a predetermined polarity in the converter for controlling the transfer from starting to running voltage, and timing means operative only after the energization of the starting means and until the energization of the running means for disconnecting the converter from the alternating-current circuit, if the transfer from starting to running voltage be not effected within an interval of time corresponding to the time setting of the timing means.

5. In an electrical distribution system, the combination with an alternating-current circuit, a direct-current circuit and a synchronous converter to be connected therebetween, of means for applying starting voltage to the converter windings from the alternating-current circuit, means for subsequently applying normal operating voltage, means dependent upon the development of a predetermined polarity in the converter for controlling the transfer from starting to running voltage, timing means for controlling the starting voltage means dependent upon the failure of the transfer from starting to running condition and means for controlling said timing means comprising an electromagnetic relay switch and a switch controlled by the running voltage-applying means.

6. In an electrical distribution system, the combination with an alternating-current circuit, a direct-current circuit and a synchronous converter to be connected therebetween, of means for applying starting voltage to the converter windings from the alternating-current circuit, means for subsequently applying normal operating voltage, means dependent upon the development of a predetermined polarity in the converter for controlling the transfer from starting to running voltage, and a timing device comprising one means for disconnecting the converter from the alternating-current circuit if the transfer from starting to running condition is not made within a predetermined interval of time after the application of starting voltage to the converter and another means for isolating the converter from both circuits if the demand upon the converter from the direct-current circuit is less than a predetermined value for a predetermined interval of time.

7. In an electrical distribution system, the combination with an alternating-current circuit, a direct-current circuit and a synchronous converter to be connected therebetween, of means for applying starting voltage to the converter windings from the alternating-current circuit, means for subsequently applying normal running voltage, means connected to the direct-current end of the converter for controlling the transfer from starting to running voltage and means for disconnecting the converter from the alternating-current circuit if such transfer is not made within a predetermined interval of time.

8. The combination with an alternating-current circuit, a direct-current circuit and a rotary transformer to be connected therebetween, of means for applying reduced starting and normal running voltages to the transformer from the alternating-current circuit, means connected to the direct-current end of the transformer for controlling the transfer from starting to running voltage and means for disconnecting the transformer from the alternating-current circuit if the transfer is not effected within a predetermined interval of time.

9. In an electrical distribution system, the combination with an alternating-current circuit, a direct-current circuit and a synchronous converter to be connected therebetween, of means for applying starting voltage to the converter windings from the alternating-current circuit, means for subsequently applying normal operating voltage, an auxiliary control circuit energized from the alternating-current circuit, a timing relay provided with two switches and means for closing one switch after a relatively short interval and for closing the other switch after a relatively long interval of energization, means whereby the short-interval switch may control the disconnection of the converter from the system to preclude the automatic reconnection thereof and means whereby the long-interval switch may control the disconnection of the converter from the system but may permit the automatic reconnection thereof to the system.

10. In a power-distribution system, the combination with an alternating-current system, a direct-current system and a rotary transformer for translating energy between the two systems, of means for consecutively applying reduced and normal electromotive forces to the rotary transformer from the alternating-current system, means connected to the direct-current end of the transformer for controlling the transfer from application of reduced to normal electromotive force and means operative before such transfer to disconnect the transformer from the system if the transfer be not made within a predetermined relatively short interval and operative after the transfer if the amount of energy translated be less than a predetermined amount for a predetermined interval of time.

11. In a power-distribution system, the combination with an alternating-current system, a direct-current system and a rotary transformer for translating energy between the two systems, of means for consecutively applying reduced and normal electromotive forces to the rotary transformer from the alternating-current system, means for automatically initiating and controlling the application of the reduced electromotive force to the transformer, means responsive to a predetermined condition of the direct-current end of the transformer for controlling the transfer from reduced to normal electromotive force and means for disconnecting the transformer from the system if the transfer be not made within a predetermined interval of time and for precluding the automatic reconnection to the alternating-current system, and for also disconnecting the converter from the system if the translation of energy between the two circuits be less than a predetermined value for a predetermined interval of time after the transfer from reduced to normal electromotive force is effected.

12. In an electrical system, the combination with an alternating-current circuit, a direct-current circuit and a synchronous converter for translating energy therebetween, or relay-controlled means operative in a predetermined sequence for controlling the development of a predetermined polarity and the connection of the converter between the two circuits, in which sequence the respective means are dependent for their operation only upon the completion of the operation of the preceding means in said sequence and a timing means for disconnecting the converter from the system if two predetermined relay-controlled means are not operated within a predetermined interval of time.

13. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence, a master relay operative early in the sequence for controlling the energization of the relay-controlled means subsequently to its operation, and means for rendering the master relay ineffective upon the failure of two predetermined relay-controlled means to operate within a predetermined interval of time.

14. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence, a master relay operative early in the sequence for controlling the energization of the relay-controlled means subsequently operative, and means dependent upon a predetermined faulty condition in either the converter or the relay-controlled means for rendering the master relay ineffective.

15. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence, a master relay operative early in the sequence for controlling the energization of the relay-controlled means subsequently to its operation, means for automatically initiating and controlling the energization of the master relay to render it effective in response to a predetermined condition, and means for selectively controlling the master relay to render it ineffective upon the occurrence of a temporary abnormal condition whereby the transformer is disconnected from the system but may be automatically reconnected thereto, and for so controlling the master relay upon the occurrence of a persisting abnormal condition that the converter is disconnected from the system and precluded from being reconnected to the system by the automatic initiating means.

16. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence, a master relay operative early in the sequence for controlling the energization of the relay-controlled means subsequently to its operation, means for automatically initiating and controlling the energization of the master relay to render it effective in response to a predetermined condition, and means for selectively controlling the master relay to render it momentarily ineffective upon the occurrence of transient abnormal conditions but yet operable by the automatic initiating and controlling means and also for rendering the master relay ineffective and nonoperable by the automatic initiating and controlling means upon the occurrence of persistent faulty conditions.

17. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence, a master relay operative early in the sequence for controlling the energization of the relay-controlled means subsequently operative, and a lockout switch for controlling the master relay to render it ineffective and to preclude a subsequent operation thereof upon the occurrence of a lasting faulty condition until such condition is eliminated.

18. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence, of means selectively responsive to only predetermined faulty conditions in the converter or in the relay-controlled means for rendering such relay-controlled means ineffective until such selective means is subsequently reset.

19. In a power-distributing system, the combination with an alternating-current circuit, a direct-current circuit and a synchronous converter for translating energy therebetween, of means for starting the converter, controlling the development of a predetermined polarity and then connecting the converter between the two circuits, means for automatically initiating the operation of said starting and controlling means under predetermined conditions and protective means for selectively controlling the automatic initiating means to render the same ineffective temporarily upon the occurrence of transient abnormal conditions and to maintain the same ineffective upon the occurrence of persisting faulty conditions.

20. In a power-distributing system, the combination with an alternating-current circuit, a direct-current circuit and a synchronous converter for translating energy therebetween provided with a shunt field winding, of means for impressing a reduced electromotive force on the converter to start the same and to permit the development of chance polarity at the direct-current end, means comprising a relay responsive to the value of the direct-current electromotive force generated by the converter and a relay responsive to the polarity of such electromotive force for controlling the development of a predetermined polarity in the converter by controlling the direction of excitation of the shunt field winding and effecting the ultimate connection of the shunt field winding to the converter always in the same manner, and means subsequently controlled by the polarity-responsive relay after the development of the predetermined polarity for removing the reduced electromotive force and controlling the application of normal operating electromotive force to the converter.

21. In a power-distributing system, the combination with an alternating-current circuit, a direct-current circuit and a synchronous converter for translating energy therebetween provided with a shunt field winding, of means for impressing a reduced electromotive force on the converter to start the same and to permit the development of chance polarity at the direct-current end, and means comprising a relay responsive to the value of the direct-current electromotive force generated by the converter and a relay responsive to the polarity of such electromotive force for controlling the development of a predetermined polarity in the converter by controlling the direction of excitation of the shunt field winding while the converter is subjected to the reduced electromotive force.

22. The combination with an alternating-current circuit, a direct-current circuit and a synchronous converter to be connected therebetween and provided with a shunt field winding, of means for applying starting and normal operating voltages to the converter, means for subsequently connecting the converter to the direct-current circuit and means responsive to the current traversing the field winding for controlling the connection of the converter to the direct-current circuit.

23. The combination with an alternating-current circuit, a direct-current circuit and a synchronous converter to be connected therebetween and provided with a shunt field winding, of means for applying starting and normal operating voltages to the converter, means for subsequently connecting the converter to the direct-current circuit and means dependent upon the field winding circuit being complete for controlling the connection of the converter to the direct-current circuit.

24. The combination with an alternating-current circuit, a direct-current circuit and a synchronous converter to be connected therebetween and provided with a shunt field winding, of means for applying starting and normal operating voltages to the converter, means for subsequently connecting the converter to the direct-current circuit and means dependent upon current of a predetermined value traversing the field winding for controlling the connection of the converter to the direct-current circuit.

25. The combination with an alternating-current circuit, a direct-current circuit and a synchronous converter to be connected therebetween and provided with a shunt field winding, of means for applying starting and normal operating voltages to the converter, means for subsequently connecting the converter to the direct-current circuit, means for rendering said means non-operative and means for precluding a reapplication of starting voltage to the converter until the generated voltage decreases to a predetermined value.

26. The combination with an alternating-current circuit, a direct-current circuit and a synchronous converter to be connected therebetween and provided with a shunt field winding, of means for applying starting and normal operating voltages to the converter, means for subsequently connecting the converter to the direct-current circuit, means for rendering said means non-operative and means for precluding a reapplication of starting voltage to the converter until the field current reduces to a predetermined value.

27. The combination with an alternating-current circuit, a direct-current circuit and a synchronous converter to be connected therebetween and provided with a shunt field winding, of means for applying starting and normal operating voltages to the converter, means for subsequently connecting the converter to the direct-current circuit, means for rendering said means non-operative and means responsive to the field current for precluding a reapplication of the starting voltage to the converter until such current decreases to a predetermined value.

28. The combination with a synchronous converter and means for consecutively applying relatively small starting and normal operating electromotive forces to the converter, of means comprising a polarity-responsive device and a voltage-responsive device for controlling the development of a predetermined polarity in the converter and then controlling the transfer from the starting to the operating electromotive force.

29. The combination with a synchronous converter and means for consecutively applying relatively small starting and normal operating electromotive forces to the converter, of means comprising a polarity-responsive device and a voltage-responsive device for controlling the development of a predetermined polarity in the converter and means for controlling the transfer from the starting to the operating electromotive force.

30. The combination with a synchronous converter and means for consecutively applying relatively small starting and normal operating electromotive forces to the converter, of means comprising a polarity-responsive device and a voltage-responsive device for controlling the development of a predetermined polarity in the converter and means for controlling the transfer from the starting to the operating electromotive force and means operative after such transfer for rendering the polarity-controlling means non-operative.

31. The combination with a synchronous converter and means for consecutively applying relatively small starting and normal operating electromotive forces to the converter, of means comprising a polarity-responsive device and a voltage-responsive device for controlling the development of a predetermined polarity in the converter, means for controlling the transfer from the starting to the operating electromotive force and means controlled by the means for applying the normal operating electromotive force to the converter for precluding further operation of the polarity-controlling means after such transfer from starting to operating electromotive force.

32. The combination with an alternating-current circuit, a direct-current circuit and a synchronous converter to be connected therebetween and provided with a shunt field winding, of means for controlling the polarity of the converter by controlling the direction of excitation of the shunt field winding of the converter, comprising switching means having one position for normal direction of field-winding excitation and another position for reversing the field excitation, means operative as a standard of polarity, having one position when the polarity of the converter is in a predetermined direction corresponding to the polarity of the direct-current circuit and a second position when the converter polarity is reversed relative to that of the direct-current circuit, and a voltage relay operative when the polarity standard means occupies the position indicating reversed polarity to control the actuation of the switching means to the position for reversing the field excitation.

33. The combination with an alternating-current circuit, a direct-current circuit and a synchronous converter to be connected therebetween and provided with a shunt field winding, of switching means having a normal operating position and a reverse operating position for controlling the direction of excitation of the field winding to control the development of a predetermined polarity, and a voltage relay rendered operative when other than a predetermined polarity is developed in the converter to actuate the switching means to the reverse operating position and rendered inoperative when the correct polarity is developed, whereby the field winding may then be properly connected to the converter in a predetermined direction.

34. The combination with an alternating-current circuit, a direct-current circuit and a synchronous converter to be connected therebetween and provided with a shunt field winding, of means for connecting the converter between the two circuits, means for rendering the connecting means non-operative and means for precluding the reconnection of the converter to the alternating-current circuit until the field current has decreased to a predetermined value.

35. The combination with an alternating-current circuit, a direct-current circuit and a synchronous converter to be connected therebetween and provided with a shunt field winding, of means for connecting the converter between the two circuits, automatically in response to a predetermined condition in the direct-current circuit, means for disconnecting the converter from both circuits when such condition does not obtain for a predetermined interval of time and means for precluding the reconnection of the converter, upon the recurrence of such condition immediately after the disconnection, until the generated direct voltage of the converter decreases to a predetermined value.

36. The combination with an alternating-current circuit, a direct-current circuit and a synchronous converter to be connected therebetween and provided with a shunt field winding, of means for connecting the converter between the two circuits, automatically in response to a predetermined condition in the direct-current circuit, means for disconnecting the converter from both circuits when such condition does not obtain for a predetermined interval of time and means responsive to the field current for precluding the reconnection of the converter upon the recurrence of such condition immediately after the disconnection, until the generated direct voltage of the converter decreases to a predetermined value.

In testimony whereof, I have hereunto subscribed my name this second day of October 1922.

STUART G. LEONARD.